No. 695,040. Patented Mar. 11, 1902.
C. H. DRAPER & E. S. STIMPSON.
FILLING REPLENISHING MECHANISM FOR LOOMS.
(Application filed Nov. 14, 1901.)
(No Model.) 2 Sheets—Sheet 1.

Witnesses,
Edward F. Allen.
Herman J. Sartoris.

Inventors,
Clare H. Draper,
Edward S. Stimpson,
by Crosby Gregory
attys.

No. 695,040. Patented Mar. 11, 1902.
C. H. DRAPER & E. S. STIMPSON.
FILLING REPLENISHING MECHANISM FOR LOOMS.
(Application filed Nov. 14, 1901.)

(No Model.) 2 Sheets—Sheet 2.

Witnesses,
Edward F. Allen.
Herman J. Sartoris.

Inventors,
Clare H. Draper,
Edward S. Stimpson,
By Crosby Gregory
Attys

UNITED STATES PATENT OFFICE.

CLARE H. DRAPER AND EDWARD S. STIMPSON, OF HOPEDALE, MASSACHUSETTS, ASSIGNORS TO DRAPER COMPANY, OF HOPEDALE, MASSACHUSETTS, A CORPORATION OF MAINE.

FILLING-REPLENISHING MECHANISM FOR LOOMS.

SPECIFICATION forming part of Letters Patent No. 695,040, dated March 11, 1902.

Application filed November 14, 1901. Serial No. 82,232. (No model.)

*To all whom it may concern:*

Be it known that we, CLARE H. DRAPER and EDWARD S. STIMPSON, citizens of the United States, and residents of Hopedale, county of Worcester, State of Massachusetts, have invented an Improvement in Filling-Replenishing Mechanism for Looms, of which the following description, in connection with the accompanying drawings, is a specification, like characters on the drawings representing like parts.

In the type of automatic loom shown and described in United States Patent No. 529,940, dated November 27, 1894, filling-replenishing means is provided whereby, as occasion demands, a fresh supply of filling is transferred from a suitable hopper or feeder to the shuttle, such feeder being shown in the patent referred to as essentially two circular plates mounted to rotate intermittently and in unison and holding between them a series of filling-carriers, the latter being transferred one by one to the shuttle by suitable transferring means. A circular disk is mounted at the outer end of and rotates with the feeder and is provided on its outer face with a stud, the filling ends being led from the several filling-carriers over the periphery of the disk and thence to the stud, about which they are secured. The transfer of a filling-carrier to the shuttle sometimes causes breakage of the filling end before it can unwind with sufficient rapidity from the filling-carrier being transferred to the shuttle.

This invention has for its object the production of novel means for preventing such breakage of the filling ends by providing a surplus or slack portion of filling between the feeder and the filling-end-holding means, the slack or surplus portion normally maintained taut being released instantly as the filling-carrier is transferred to the shuttle.

The various novel features of our invention will be hereinafter described, and particularly pointed out in the following claims.

Figure 1:
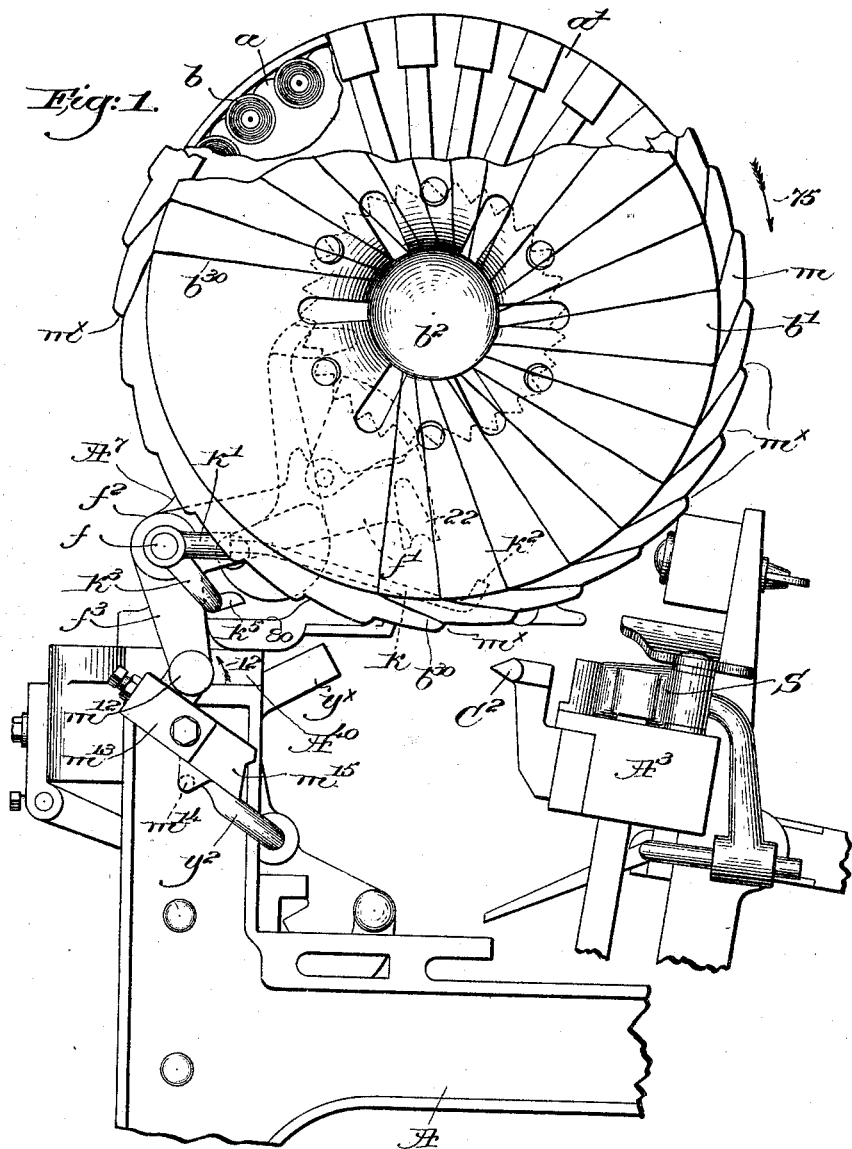
Figure 2:
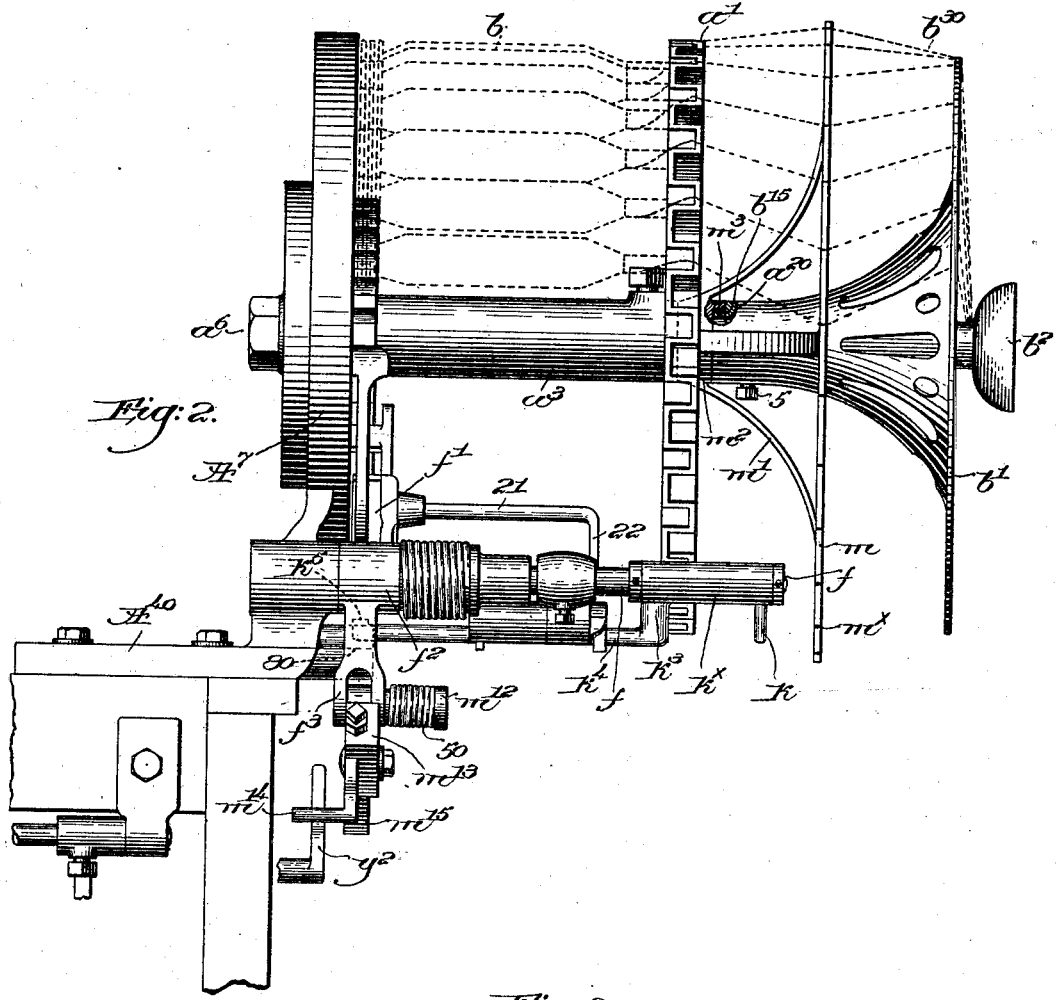
Figure 3:
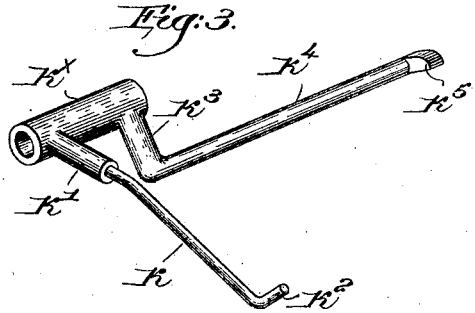

Figure 1 is a right-hand side elevation, partly broken out, of a sufficient portion of a loom and the filling-replenishing mechanism therefor to be understood with one embodiment of our invention applied thereto. Fig. 2 is a front elevation of the filling-replenishing mechanism shown in Fig. 1, some of the filling-carriers and the filling ends being shown in dotted lines to illustrate the manner in which the slack or surplus portion of the filling is provided; and Fig. 3 is a perspective detail, detached, of means for positively releasing the filling at the time of transfer.

The loom-frame A, lay $A^3$, the bunter $C^2$ thereon, the self-threading shuttle S, of suitable construction, the stand $A^7$, substantially circular in shape and secured upon and transversely to the breast-beam $A^{40}$, and the filling-feeder may be and are substantially as shown and described in Patent No. 664,790, dated September 24, 1900, to which reference may be had.

The feeder comprises, essentially, two disks $a\ a'$, connected to rotate in unison by a hub $a^3$, rotatably mounted on a stud $a^6$, fixedly mounted on the stand $A^7$, the filling-carriers $b$ (see dotted lines, Fig. 2, and full lines, Fig. 1) being held at their ends between the two disks. At the outer end of the feeder filling-end-holding means is provided comprising a disk $b'$, provided with a stud $b^2$, the hub of the disk being secured by a set-screw 5, Fig. 2, to a boss $a^{20}$, projecting from the outer face of the disk $a'$. The filling ends $b^{30}$ are led from the periphery of the disk $a'$ to the periphery of the disk $b'$ and then down and wrapped around the stud $b^2$; but between the two disks the filling ends are deflected from their direct paths by means to be described, so that when the threads are released between the two disks they will hang slack or provide a surplus portion to prevent shock due to too sudden strain on the filling at the time of transfer.

A disk $m$, having a series of peripheral notches $m^\times$ equal in number to the filling-carriers which may be carried in the feeder, is connected by arms $m'$, Fig. 2, to a hub $m^2$, which surrounds the boss $a^{20}$ between the disk $a$ and the adjacent end of the hub of the disk $b'$, the latter having a notch or recess $b^{15}$ therein to be entered by a lug $m^3$, (shown only in Fig. 2,) projecting outwardly from the hub $n^2$, so that the disk $m$, which we shall hereinafter designate as the "slack-supporter," will rotate with the feeder and disk $b'$. Referring to Figs. 1 and 2, it will be noted that the slack-supporter is set forward, as it were, so that its notches $m^\times$ will be non-alined with the direct path of a filling-thread between the disk $a'$ of the feeder and the disk $b'$, and when the attendant places a filling-carrier in the feeder he takes the filling end $b^{30}$ and enters it into one of the notches $m^\times$ and thence carries it over the disk $b'$ and down to the stud $b^2$, wrapping the loose end around the latter, so that the filling ends will be deflected between the disks $a'$ $b'$, as shown in Figs. 1 and 2. The diameter of the slack-supporter is somewhat larger than that of either of the disks $a'$ $b'$ to give an additional slack portion of thread at the proper time by the radial deflection. During the normal operation of the loom the several filling ends will be held by the means hereinbefore described sufficiently taut to prevent entanglement one with another.

The stand $A^7$ supports a fixed horizontal stud $f$, on which is loosely mounted the hub $f^2$ of an arm $f'$, constituting the transferrer, as in the patents referred to, said transferrer being provided with a lateral arm 21, having a downturned end 22 to engage the tip of the filling-carrier at the time of transfer, the transferrer and arm 21 extending in between the disks of the feeder, as shown in Fig 2. A headed rocker-stud $m^{12}$ is mounted on the downturned arm $f^3$ of the transferrer, as in United States Patent No. 664,790, and by a spring 50, Fig. 2, the stud is normally turned in the direction of the arrow 12, Fig. 1, an arm $m^{13}$, secured to the stud, having a lateral lug $m^{14}$, against which rests the branch $y^2$ of the shuttle-feeder $y^\times$, and a notched dog $m^{15}$ is adjustably secured to the arm $m^{13}$, said dog being movable into the path of the bunter $C^2$ on the lay when a change of filling is to be effected, all in well-known manner. We have herein shown the stud $f$ as extended to support the hub $k^\times$ of a knock-off device, the same consisting of an arm $k$, secured in a boss $k'$ on the hub $k^\times$ and having its inner end extended toward the back of the loom and between the slack-supporter and the disk $a'$, the inner extremity of said arm $k$ being preferably upturned at $k^2$. At its inner end the hub $k^\times$, which is loosely mounted on the stud $f$, is provided with a radial arm $k^3$, provided at its extremity with a lateral extension $k^4$, extended toward the center of the loom and across the inner edge of the depending arm $f^3$. The weight of the knock-off device normally maintains it in the position shown in Fig. 1, with the extension $k^4$ resting against the edge of the depending arm $f^3$, while the knock-off arm $k$ projects just above the filling end of the filling-carrier next to be transferred from the feeder. When the transferrer $f'$ is depressed from the position shown in Fig. 1 to engage and transfer the endmost filling-carrier of the series from the feeder to the shuttle, the knock-off device will simultaneously rock on the stud $f$, and the arm $k$ will lightly hit the filling end just beneath it to cast it off or remove it from the notch $m^\times$ in the disk $m$, so that the said filling end will hang slack at the instant of transfer, and the slack or surplus portion so provided will be sufficient to obviate a breaking strain upon the filling as the shuttle is thrown from the box, or it may be as the filling-carrier is transferred to the shuttle. The automatic return of the transferrer to normal position after such transferrer acts, through the depending arm $f^3$, to restore the knock-off device to normal position, and the upturned end $k^2$ of the arm $k$ serves as a guard to prevent improper engagement of said knock-off device with the next filling end as the feeder is rotated in the direction of the arrow 75, Fig. 1. A stop $k^5$ on the inner extremity of the extension $k^4$ engages a shoulder 80 (see Fig. 1) on the stand $A^7$ when the knock-off device operates to limit the rocking movement of the same and preventing the arm $k$ from descending far enough to be hit by the lay or any moving part of the loom. When a filling-carrier is transferred from the feeder to the shuttle, the downward movement of the filling-carrier will of itself release the filling end from the slack-supporter, inasmuch as the filling merely rests upon the peripheral edge thereof; but any accidental sticking of the thread to the notched disk or sluggishness of release by the downward movement of the filling-carrier when transferred will be prevented by the knock-off device.

The construction is simple and effective, and a sufficient surplus portion of refilling is provided by the release of each filling end from the slack-supporter.

Our invention is not restricted to the precise construction and arrangement herein shown and described, as the same may be modified or rearranged in various particulars without departing from the spirit and scope of our invention.

Having fully described our invention, what we claim as new, and desire to secure by Letters Patent, is—

1. In filling-replenishing mechanism for looms, a feeder to contain a supply of filling, a filling-end holder at the outer end thereof, a slack-supporter between the feeder and end-holder, to engage and deflect the filling from its direct path, and means to automatically engage the filling and positively disengage it from the slack-supporter when the supply of filling is transferred.

2. In filling-replenishing mechanism for looms, a feeder to contain a plurality of supplies of filling, a holder for the several ends of filling, located at the outer end of the feeder, a slack-supporter to engage the individual threads between the feeder and holder and deflect them from their direct paths, and means to automatically disengage said threads one after another from the slack-supporter when the supplies of filling are transferred from the feeder.

3. In a loom, an intermittingly-rotatable feeder adapted to contain a series of filling-carriers, a filling-end holder rotatable with and located at the outer end of the feeder, a slack-supporter to engage said filling ends between the feeder and holder and deflect them from their direct paths, a transferrer to transfer the filling-carriers one by one from the feeder, and means to automatically release the filling end of the transferred supply from the slack-supporter when transfer is effected.

4. In filling-replenishing mechanism for looms, a rotatable feeder to contain a plurality of filling-carriers, means rotatable with the feeder to hold the several filling ends, a notched disk between said means and the feeder and rotatable therewith, to engage the filling ends and deflect them from their direct paths, transferring means, and a knock-off operative by or through actuation of said transferring means to engage and release from its notch in the disk the filling end of the carrier transferred.

5. In filling-replenishing mechanism for looms, a rotatable feeder to contain a plurality of filling-carriers, means rotatable with the feeder to hold the several filling ends, said means including a disk over the periphery of which the filling ends pass, a peripherally-notched disk of greater diameter, interposed between and rotatable with said feeder and end-holding means, to engage and deflect the filling ends from their direct paths, transferring means, and a knock-off operative by actuation of the transferrer, to engage and withdraw from its notch the filling end of the carrier to be transferred, and thereby provide a slack or surplus portion of filling.

6. In filling-replenishing mechanism for looms, a rotatable feeder to contain a plurality of filling-carriers, means rotatable with the feeder to hold the several filling ends, said means including a disk over the periphery of which the filling ends pass, a peripherally-notched disk of greater diameter, interposed between and rotatable with said feeder and end-holding means, to engage and deflect the filling ends from their direct paths, transferring means, and a pivotally-mounted knock-off movable in proximity to the notched disk, to release therefrom the threads one by one, the operative movement of said knock-off being controlled by or through the transferring means.

7. In filling-replenishing mechanism for looms, a rotatable feeder to contain a plurality of filling-carriers, means rotatable with the feeder to hold the several filling ends, said means including a disk over the periphery of which the filling ends pass, a disk between the feeder and end-holding means and having notches at its periphery, said notches being set in advance of the direct paths of the filling ends, the latter being maintained by the notches deflected, transferring means, and a knock-off device operated by or through actuation of said transferring means to release from its notch the filling end of the carrier to be transferred.

8. In filling-replenishing mechanism for looms, a feeder to contain a supply of filling, a filling-end holder at the outer end thereof, and a slack-supporter to engage and deflect the filling from its straight path between the feeder and holder, the transfer of the filling-supply from the feeder causing the filling end to drop off the slack-supporter.

9. In filling-replenishing mechanism for looms, a rotatable feeder to contain a series of filling-carriers, a holder for the several ends of filling, located at the outer end of and rotatable with the feeder, and a disk-like slack-supporter between the feeder and holder and rotatable therewith, said supporter having a series of peripheral notches non-alined with the direct paths of filling ends between the feeder and holder, to engage and deflect the filling ends from their direct paths and thereby provide a surplus or slack portion of filling when a filling-carrier is transferred from the feeder.

10. In filling-replenishing mechanism for looms, a rotatable feeder to contain a series of filling-carriers, a holder for the several ends of filling, located at the outer end of and rotatable with the feeder and a slack-supporter between and rotatable with said feeder and holder, said supporter being made as a disk of greater diameter than the feeder, the periphery of the disk engaging the individual filling ends and deflecting them from their direct paths between the feeder and end holder.

11. In filling-replenishing mechanism for looms, a rotatable feeder to contain a plurality of filling-carriers, means rotatable with the feeder to hold the several filling ends, said means including a disk over the periphery of which the filling ends pass, a disk intermediate the feeder and end-holding means and rotatable therewith, the periphery of the said disk engaging and supporting the filling ends and deflecting them from their direct paths, to thereby provide a slack portion of filling when a filling-carrier is transferred, and transferring means.

12. In filling-replenishing mechanism for looms, a rotatable feeder to contain a plurality of filling-carriers, means rotatable with the feeder to hold the several filling ends, said means including a disk over the periphery of which the filling ends pass, a peripherally-notched disk intermediate and rotatable with the feeder and end-holding means and of greater diameter than the disk of the latter, the notches being out of alinement, radially and circumferentially, with the direct paths of the filling ends between the feeder and end-holding means, to deflect said filling ends both radially and circumferentially and thereby provide a slack portion when a filling-carrier is transferred, and transferring means.

In testimony whereof we have signed our names to this specification in the presence of two subscribing witnesses.

CLARE H. DRAPER.
EDWARD S. STIMPSON.

Witnesses:
GEORGE OTIS DRAPER,
ERNEST WARREN WOOD.